(12) United States Patent
Singer et al.

(10) Patent No.: US 6,677,896 B2
(45) Date of Patent: *Jan. 13, 2004

(54) REMOTE TILT ANTENNA SYSTEM

(75) Inventors: Andrew Singer, Meriden, CT (US); William Drach, West Long Branch, NJ (US)

(73) Assignee: Radio Frequency Systems, Inc., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/817,268

(22) Filed: Mar. 27, 2001

(65) Prior Publication Data

US 2001/0033247 A1 Oct. 25, 2001

Related U.S. Application Data

(63) Continuation of application No. 09/343,088, filed on Jun. 30, 1999, now Pat. No. 6,239,744.

(51) Int. Cl.$^7$ ................................................ H01Q 3/00
(52) U.S. Cl. ......................... 342/359; 342/74; 343/766
(58) Field of Search .................... 342/74, 372, 359; 343/763, 766

(56) References Cited

U.S. PATENT DOCUMENTS

| | | |
|---|---|---|
| 2,041,600 A | 5/1936 | Friis |
| 2,432,134 A | 12/1947 | Bagnall |
| 2,540,696 A | 2/1951 | Smith, Jr. |
| 2,596,966 A | 5/1952 | Lindsay, Jr. |

(List continued on next page.)

FOREIGN PATENT DOCUMENTS

| | | |
|---|---|---|
| DE | 33 22 986 A1 | 1/1985 |
| DE | 33 23 234 A1 | 1/1985 |
| EP | 0 137 562 A2 | 4/1985 |
| EP | 0 241 153 A2 | 10/1987 |

(List continued on next page.)

OTHER PUBLICATIONS

Bickmore, "Adaptive antenna arrays," *IEEE Spectrum*, Aug. 1964, pp. 78–88.

Kummer, "Feeding and Phase Scanning," Chapter 1 from Hansen, *Microwave Scanning Antennas*, vol. 3, pp. 1–133.

Skolnik, "The Electronically Steered Phased Array Antenna in Radar," Chapter 8 from *Introduction to Radar Systems*, $2^{nd}$ ed., 1982, pp. 278–337.

(List continued on next page.)

Primary Examiner—Dao Phan
(74) Attorney, Agent, or Firm—Sughrue Mion, PLLC (57) ABSTRACT

An antenna control system is connected to an antenna in order to control the position of the antenna. The system includes a motor connected to the antenna for adjusting the position or vertical tilt angle of the antenna. A driver is provided for operating the motor. A sensor is also provided to detect the position of the antenna. In addition, an antenna controller is connected to an antenna memory, the driver, and the sensor, for reading the detected position of the antenna and for controlling the driver to adjust the antenna's position. A main controller is connected to the antenna controller for sending commands to and reading data from the antenna controller. In this manner, the main controller can interface with any number of antennas at a base station and control the position or down-tilt of each antenna. According to one embodiment of the control system, a user interface is also provided for entering commands to and reading data from the main controller. The interface can be provided at the base station or tower or at a remote location via, for example, modem. According to one embodiment of the invention the user interface is a laptop computer. A user or technician can then enter commands and monitor the position of the antennas from a remote location.

32 Claims, 10 Drawing Sheets

U.S. PATENT DOCUMENTS

| | | | |
|---|---|---|---|
| 2,648,000 A | | 8/1953 | White |
| 2,773,254 A | | 12/1956 | Engelman |
| 2,836,814 A | | 5/1958 | Nail |
| 2,968,808 A | | 1/1961 | Russell |
| 3,032,759 A | | 5/1962 | Ashby |
| 3,032,763 A | | 5/1962 | Sletten |
| 3,969,729 A | | 7/1976 | Nemit |
| 4,129,872 A | | 12/1978 | Toman |
| 4,241,352 A | | 12/1980 | Alspaugh et al. |
| 4,427,984 A | | 1/1984 | Anderson |
| 4,532,518 A | | 7/1985 | Gaglione et al. |
| 4,564,824 A | | 1/1986 | Boyd, Jr. |
| 4,575,697 A | | 3/1986 | Rao et al. |
| 4,652,887 A | | 3/1987 | Cresswell |
| 4,714,930 A | | 12/1987 | Winter et al. |
| 4,717,918 A | | 1/1988 | Finken |
| 4,768,001 A | | 8/1988 | Chan-Son-Lint et al. |
| 4,788,515 A | | 11/1988 | Wong et al. |
| 4,791,428 A | | 12/1988 | Anderson |
| 4,804,899 A | | 2/1989 | Wurdack et al. |
| 4,814,774 A | | 3/1989 | Herczfeld |
| 4,821,596 A | | 4/1989 | Eklund |
| 5,089,824 A | * | 2/1992 | Uematsu et al. ............ 342/359 |
| 5,093,923 A | | 3/1992 | Leslie |
| 5,162,803 A | | 11/1992 | Chen |
| 5,170,140 A | | 12/1992 | Lowe et al. |
| 5,181,042 A | | 1/1993 | Kaise et al. |
| 5,184,140 A | | 2/1993 | Hariu et al. |
| 5,214,364 A | | 5/1993 | Perdue et al. |
| 5,227,806 A | * | 7/1993 | Eguchi ...................... 343/765 |
| 5,241,319 A | * | 8/1993 | Shimizu ..................... 342/358 |
| 5,274,382 A | * | 12/1993 | Wills et al. ................. 342/359 |
| 5,281,974 A | | 1/1994 | Kuramoto et al. |
| 5,300,935 A | * | 4/1994 | Yu .............................. 342/359 |
| 5,463,401 A | * | 10/1995 | Iwasaki ...................... 342/359 |
| 5,512,914 A | | 4/1996 | Hadzoglou et al. |
| 5,521,604 A | * | 5/1996 | Yamashita .................. 342/359 |
| 5,583,514 A | * | 12/1996 | Fulop ......................... 342/359 |
| 5,610,617 A | | 3/1997 | Gans et al. |
| 5,623,270 A | * | 4/1997 | Kempkes et al. ........... 342/372 |
| 5,661,488 A | * | 8/1997 | Kudo ......................... 342/359 |
| 5,801,600 A | | 9/1998 | Butland et al. |
| 5,809,395 A | | 9/1998 | Hamilton-Piercy et al. |
| 5,818,395 A | | 10/1998 | Bartholomew |
| 5,860,056 A | * | 1/1999 | Pond .......................... 455/13.3 |
| 6,002,364 A | * | 12/1999 | Kroeger et al. ............. 342/359 |
| 6,198,458 B1 | | 3/2001 | Heinz et al. |
| 6,239,744 B1 | * | 5/2001 | Singer et al. ............... 342/359 |

FOREIGN PATENT DOCUMENTS

| | | |
|---|---|---|
| EP | 0 357 165 A2 | 3/1990 |
| EP | 0 398 637 A2 | 11/1990 |
| EP | 0 423 512 A2 | 4/1991 |
| EP | 0 588 179 A1 | 3/1994 |
| EP | 0 595 726 A1 | 5/1994 |
| FR | 2 581 255 | 10/1986 |
| GB | 1 314 693 | 4/1973 |
| GB | 2 035 700 A | 6/1980 |
| GB | 2 158 996 A | 11/1985 |
| GB | 2 159 333 A | 11/1985 |
| GB | 2 165 397 A | 4/1986 |
| GB | 2 196 484 A | 4/1988 |
| GB | 2 205 946 A | 12/1988 |
| GB | 2 232 536 A | 12/1990 |
| JP | 1-120906 | 5/1989 |
| JP | 2-121504 | 5/1990 |
| JP | 2-174402 | 7/1990 |
| JP | 2-290306 | 11/1990 |
| JP | 4-286407 | 10/1992 |
| JP | 5-121915 | 5/1993 |
| JP | 5-191129 | 7/1993 |
| JP | 6-196927 | 7/1994 |
| WO | WO 95/10862 | 4/1995 |

OTHER PUBLICATIONS

Lagerlöf, et al., "A Phase Scanned AEW Radar Antenna," *Antennas and Propagation Symposium Digest*, vol. III, IEEE 1990, pp. 1162–1165.

Fox, "An Adjustable Wave–Guide Phase Changer," *Proceedings of the Institute of Radio Engineers*, Jul.–Dec. 1947, pp. 1489–1498.

* cited by examiner

REMOTE TILT ANTENNA SYSTEM

This is a Continuation of application Ser. No. 09/343,088 filed Jun. 30, 1999, now U.S. Pat. No. 6,239,744 the disclosure of which is incorporated herein by reference.

BACKGROUND

The present invention generally relates to antenna communication systems and in particular to a remote, tilt antenna system.

Conventional communication systems for Cellular and Personal Communication Systems (PCSs) use interconnected communications networks to allow network users to communicate with one another. PCS networks include a number of Mobile Switching Centers (MSCs) that connect network users to Private Switched Telephone Networks (PSTNs) and other MSCs. The MSCs are connected to and control a number of base stations. The base stations are located in the cells of the network in order to provide network coverage in the area that is local to the base station. The base stations are equipped with antennas that allow communication between the base station and mobile users or PCS users within the cell where the base station is located. The base stations communicate with the MSCs to allow PCS users to communicate with other PCS users and PSTN users.

Optimization of the coverage provided by the base stations for the PCS users is very challenging due to the large number of parameters necessary for successful network operation. The positioning of the base stations and their associated antennas is important to overcoming such problems as channel interference caused by overcrowding from adjacent base stations, in addition to other factors, such as the topology surrounding the base station. One method used to reduce interference with other nearby base stations is the use of down-tilt antennas. Down-tilt antennas help reduce the problem of cell site overlap by adjusting the vertical angle of radiation transmitted by the antenna with respect to the surrounding area serviced by the antenna. By positioning the antennas with a downward tilt, the area to which the radiation is dispersed by the antenna can be decreased thereby reducing interference with other base stations. However, the antennas must be carefully positioned in order to provide the necessary coverage while avoiding interference with other cells or microcells within the network and adjacent competing networks. Unfortunately, conditions at the base stations that may affect coverage can change over time requiring adjustment of the antenna position or down-tilt. As a result, the positioning of the antennas must be periodically adjusted.

For example, seasonal variations in weather and temperature may affect the radiation patterns associated with the antenna. Changing topology, due to the addition of new base stations, buildings, etc., can also affect interference, radiation patterns, and coverage associated with the base stations. As a result, it becomes necessary to adjust the positioning or tilt of the antennas.

First generation solutions used a mechanical assembly to adjust antenna down-tilt. However, this solution requires that a technician travel to and climb the tower and physically adjust each antenna every time it was necessary to adjust or provide a new antenna down-tilt. This is especially costly and time consuming when setting up a new system since several adjustments are normally required in order to provide the necessary system optimization.

Second generation solutions provide antennas with electrical down-tilt. While this solution has made it easier for the technician to position the antennas, second generation systems still require a technician to travel to the site and climb the tower by a technician, each time an antenna needs adjusting. As a result, even with electrical positioning of the antennas the problem of the required system down time for adjustments and costs associated with having to send a technician to the site remains.

SUMMARY

It is therefore an object of the invention to improve coverage provided by antennas in radio communication networks.

It is another object of the invention to provide an automated antenna system that can be automatically adjusted from a remote location.

It is a further object of the present invention to provide an antenna system that may be dynamically adjusted in real-time to respond to changing conditions.

It is a yet a further object of the present invention to provide an antenna system that can verify antenna position and test antenna elements to ensure proper operation and detect any faults associated with antenna position and operation.

It is also an object to reduce costs associated with optimizing and maintaining a network of communication antennas.

According to an exemplary embodiment of the present invention the foregoing and other objects are accomplished through implementation of a remote down-tilt antenna system. According to the invention, an antenna control system is connected to an antenna in order to control the position of the antenna. The system includes a motor connected to the antenna for adjusting the position or tilt angle of the antenna. A driver is provided for operating the motor. A sensor is also provided to detect the position of the antenna. In addition, an antenna controller is connected with an antenna memory, the driver, and the sensor for reading the detected position of the antenna and for controlling the driver to adjust the antenna's position. A main controller is connected to the antenna controller for sending commands to and reading data from the antenna controller, for example, the antenna's position. In this manner the main controller can interface with any number of antennas at a base station and control the position of each antenna.

According to an exemplary embodiment of the control system, a user interface is also provided for entering commands to and reading data from the main controller. The interface can be provided at the base station, tower, or at a remote location via, for example, a modem. According to one embodiment of the invention the user interface can be a laptop computer. A user or technician can then enter commands and monitor the positions of the antennas from a remote location allowing for real time adjustment of antenna position.

BRIEF DESCRIPTION OF THE DRAWINGS

The foregoing and other features, objects, and advantages of the invention will be better understood by reading the following description in conjunction with the drawings, in which.

DETAILED DESCRIPTION

The various features of the invention will now be described with respect to the figures, in which like parts are identified with the same reference characters.

System Overview

In a cellular communications system, an area serviced by the network is divided into one or more cells. Each cell is provided with one or more base stations to service the cell and communicate with PCS users in the cell. The base stations communicate with a central controller, for example, an MSC which coordinates communication between the base station and the mobile users. In addition, the MSC provides interconnections to PSTNs and other MSCs serving other networks.

Each base station is provided with a number of antennas for transmitting messages to and receiving messages from PCS users communicating with the base station. Typically, the number antennas range from 6 to 9 per each tower, although one skilled in the art will realize that any number of antennas may be used as needed to provide optimum coverage at any one site. Antennas provided in conventional networks are manually, mechanically, or electronically positioned by a technician at the base station according to readings taken within the cell by the technician.

Figure 1:
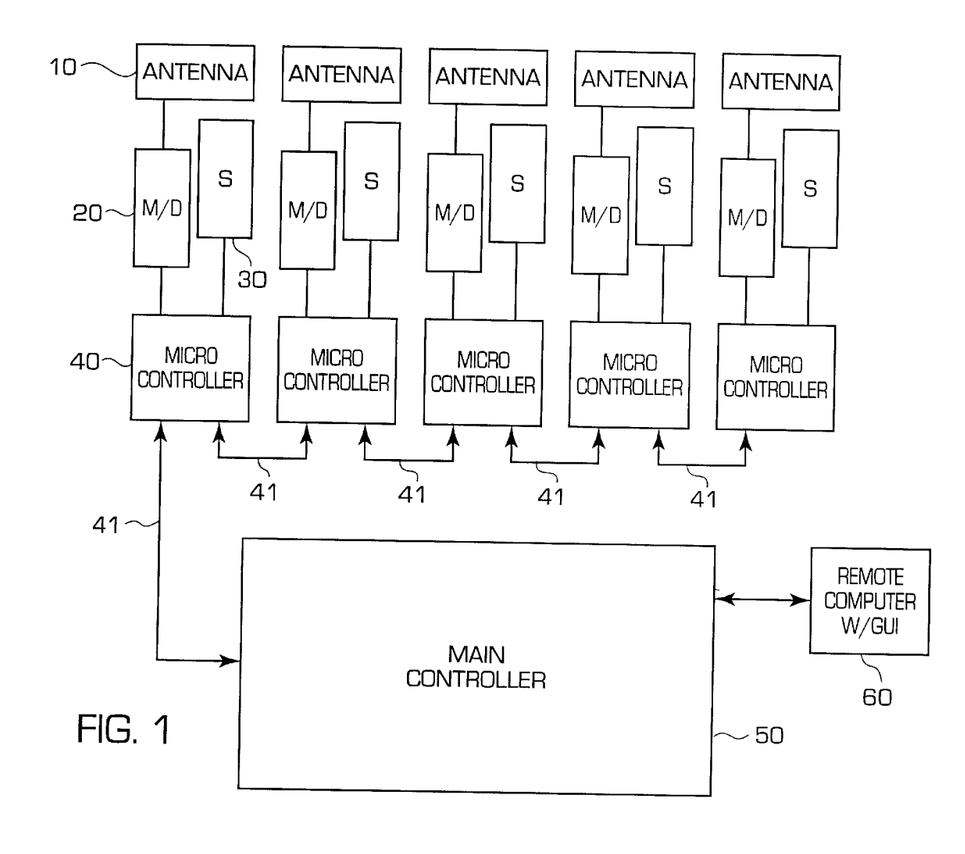
FIG. 1 shows a block diagram of a antenna control system according to an exemplary embodiment of the invention.

Turning to FIG. 1, an exemplary embodiment of the present invention will now be described. As can be seen in FIG. 1, a number of antennas 10 are provided. The antennas 10 may be placed at the top of a tower located at the base station. Alternatively, a base station may control a number of towers, each provided with their own antennas. Associated with each antenna 10 is a motor/driver assembly 20 for adjusting the position or down-tilt of the antennas. A number of controllers 40 are connected to each of the motor/driver assemblies 20. In addition, the controllers 40 are also connected to a sensor 30 forming a feedback loop to detect the position of antennas 10. One controller 40 is connected to the main controller 50 that is provided at the bottom of the tower in, for example, the equipment control room. The remaining controllers are daisy change together to form a simple network of controllers.

Each tower at the base station contains a number of antennas that are used to provide communication to the mobile units or PCS within the base station's cell. In FIG. 1, five antennas are provided, however, this number is for exemplary purposes only. Furthermore, although each antenna controller 40 is shown as being associated with an individual antenna 10, one antenna controller 40 could control a plurality of antennas.

Antenna Controller

According to an exemplary embodiment of the invention, antenna 10 is a phased array down-tilt antenna. As previously described, in order to reduce interference between base stations, the antenna's vertical tilt is controlled to be optimally placed for any particular antenna location as is known in the art. Although the exemplary embodiments described herein are made with reference to down-tilt antennas, one skilled in the art will appreciate other antennas whose positions may be adjusted could be practiced according to the invention.

Figure 2:
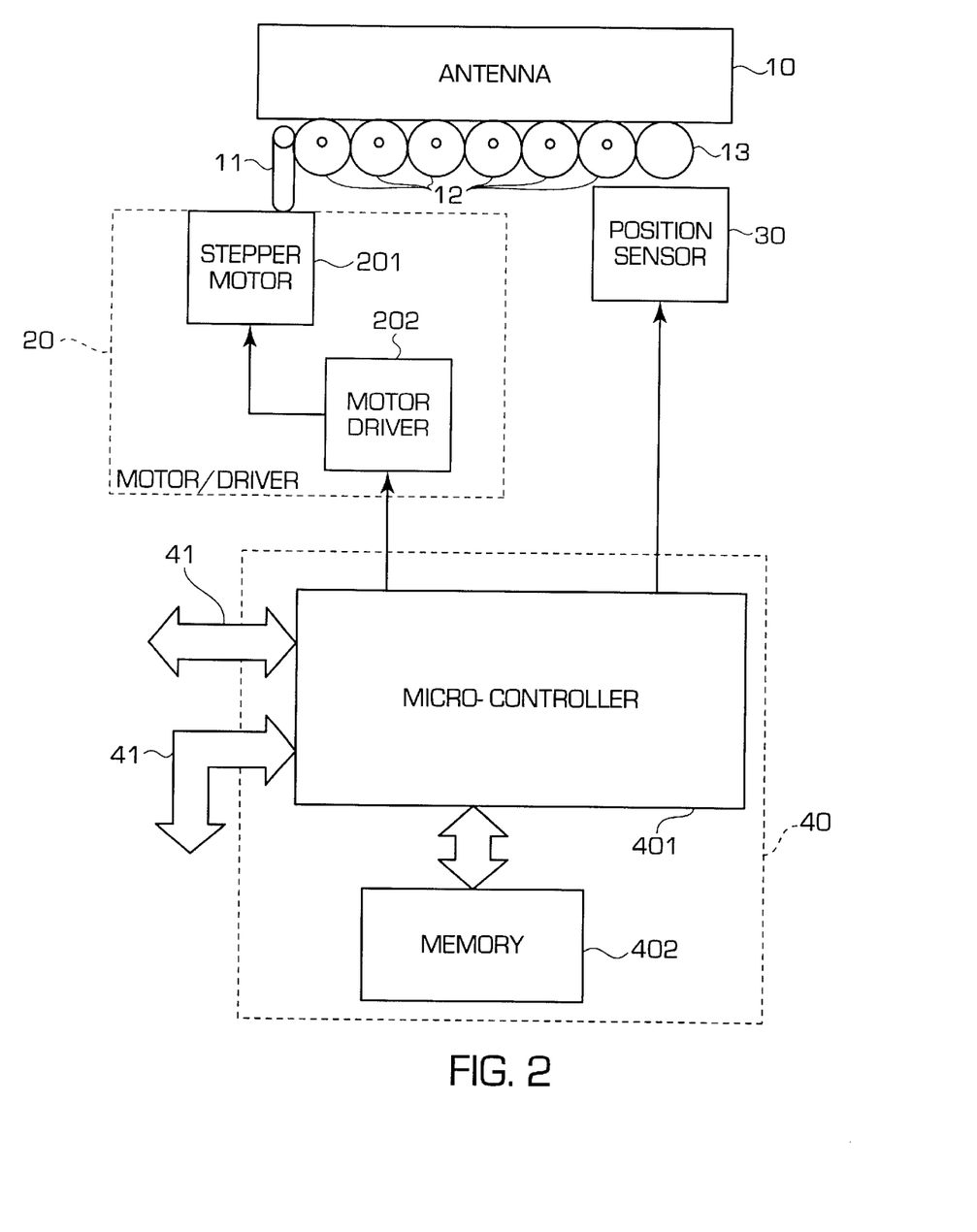
FIG. 2 shows a block diagram of the antenna controller according to an exemplary embodiment of the invention.

Turning to FIG. 2, an individual antenna controller 40 and antenna 10 are shown. According to this exemplary embodiment, a stepper motor 201 is used to drive a gear train of phase shifters 12 via gear shaft 11. In turn, the phase shifters 12, are used to steer the radiation emitted from the antenna 10 as is known in the art. According to this embodiment a single chip stepper-motor-driver 202 powers the stepper motor 11.

The antenna controller 40, according to the exemplary embodiment shown in FIG. 2, includes a micro-controller 401 and associated memory 402. The electronic equipment housing the controller 40 may be potted or encapsulated to protect the equipment from environmental conditions. In addition, each of the controllers 40 may be protected by surge and lightning protector (not shown) to protect the electronic equipment against static discharges and current surges due to nearby lightning strikes which could induce current on the signal lines and thereby damage the antenna controller 40 and related equipment.

According to one preferred embodiment, the micro controller 401 is a PIC16C84 microchip. An associated EEPROM memory 402 stores an antenna address (Ant_Address) and current antenna 10 down-tilt position (Ant_Location). One skilled in the art will appreciate that other memories, such as a RAM, could also be used without departing from the invention. Micro-controller 401 sends command signals to stepper-motor-driver 202 in order to cause the stepper motor 201 move the gear train, and thereby control the radiation pattern of its associated antenna 10. The micro controller 401 receives communications broadcast over the serial communication lines 41. Each microcontroller monitors the communications lines 41 for messages broadcast from the main controller 50 that are addressed to the individual controllers 40. In addition, the micro-controller 401 receives antenna position signals from a position sensor 30. The micro controller reads the gear position from the sensor 30 and records the current position in the memory 402.

Position Sensor

The sensor 30 is provided in proximity to the phase shifters 12. The sensor 30 detects the position of the phase shifters 12 and transmits the positions to the microcontroller 401. The microcontroller 401 writes the positional data of the antenna 10 in the memory 402. According to one embodiment, the sensor 30 is an incremental encoder sensor that detects each step of the gear train. Alternatively, an absolute encoder sensor can be used to measure the absolute gear position in terms of 360°.

According to one embodiment of the invention, an optical sensor may be used. According to this exemplary embodiment, shown in FIG. 2, an optical encoder gear 13 is located at the end of the phase gear train. The optical sensor 30 incrementally counts each movement of the encoder gear 13 and transmits its reading to the micro-controller 401. Alternatively, a mechanical brush on a trace contact may be used to detect the position of the gears 12. The position of the trace contact is converted to a digital signal by the sensor 30 and transmitted to the micro controller 401. An electromagnetic relay hall effect sensor or electromagnetic static sensor could also be used to detect the position of the gears 12 the antenna position.

By using a sensor to form a feedback loop, the position of each antenna can be detected and verified to ensure that the motor has correctly positioned the antenna. The sensor also provides a provides a means of identifying errors within the system by identifying improper placement of the antennas.

Main Tower Controller

Figure 3:
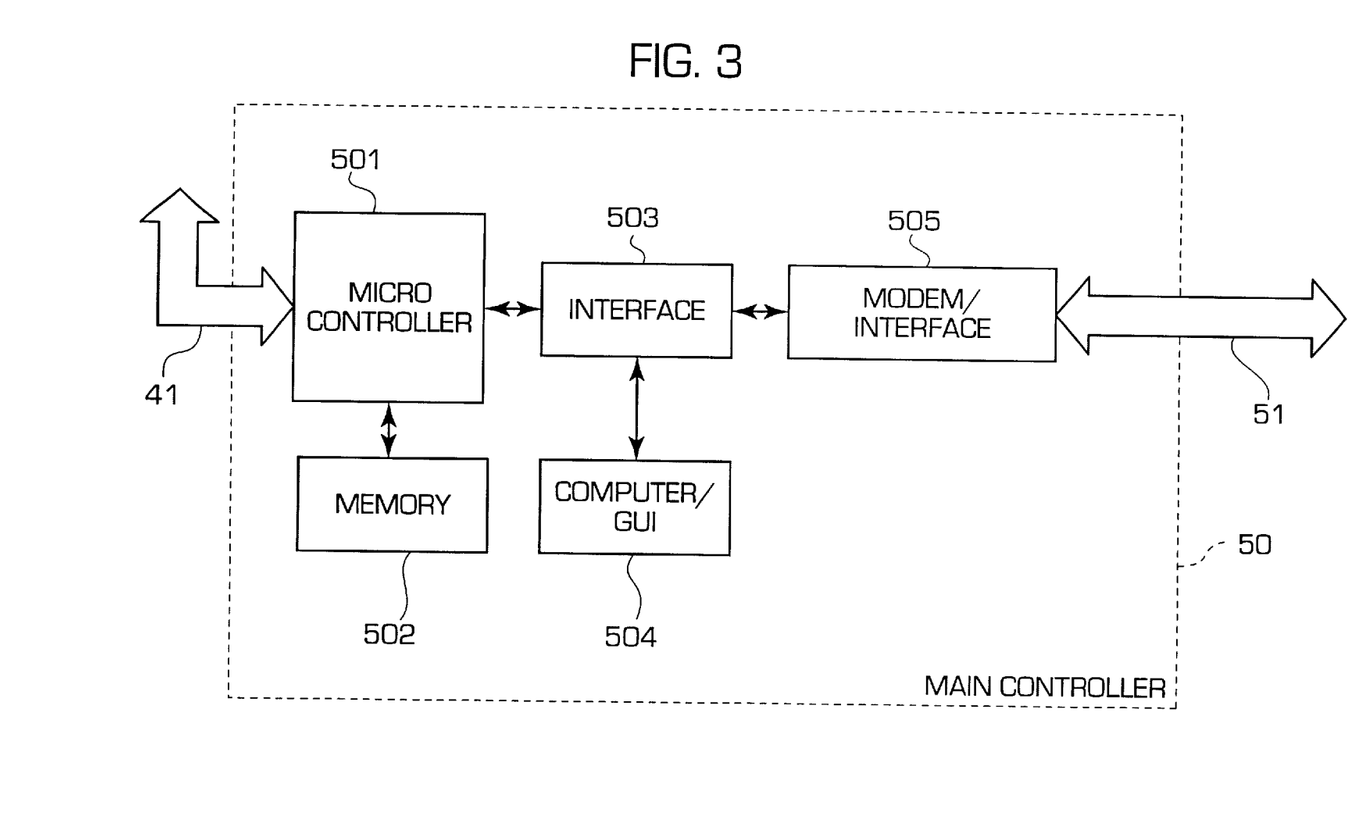
FIG. 3 shows a block diagram of the main controller system according to an exemplary of the invention.

Turning to the exemplary embodiment shown in FIG. 3, the main controller 50 may be provided in the equipment room at the base of the tower at the base station. As shown in the exemplary embodiment of FIG. 3, a Microcontroller 501 is provided to control the antenna controllers 40. According to one preferred embodiment the microcontroller 501 is implemented using a PIC16C84 microchip. The microcontroller 501 broadcasts commands to the antenna controllers 40 via serial communications line 41. According to one preferred embodiment of the invention, the communications line 41 is coaxial cable that is strung from main controller 50 up the tower to the first antenna controller 40. The remaining antenna controllers are daisy chained together also using coaxial cable.

The micro-controller 501 transmits commands addressed to each antenna controller 40. The antenna controllers 40 monitor the communications line 41 for commands. If the antenna controller 40 receives a command addressed to it, the controller reads the command and performs the appropriate function as explained in further detail below. The main controller 501 also receives messages from the antenna controllers 40 and stores appropriate data read from the messages in its associated memory 502. According to an exemplary embodiment, the memory 502 may be an EEPROM memory, although other types of memories may also be used.

Figure 4:
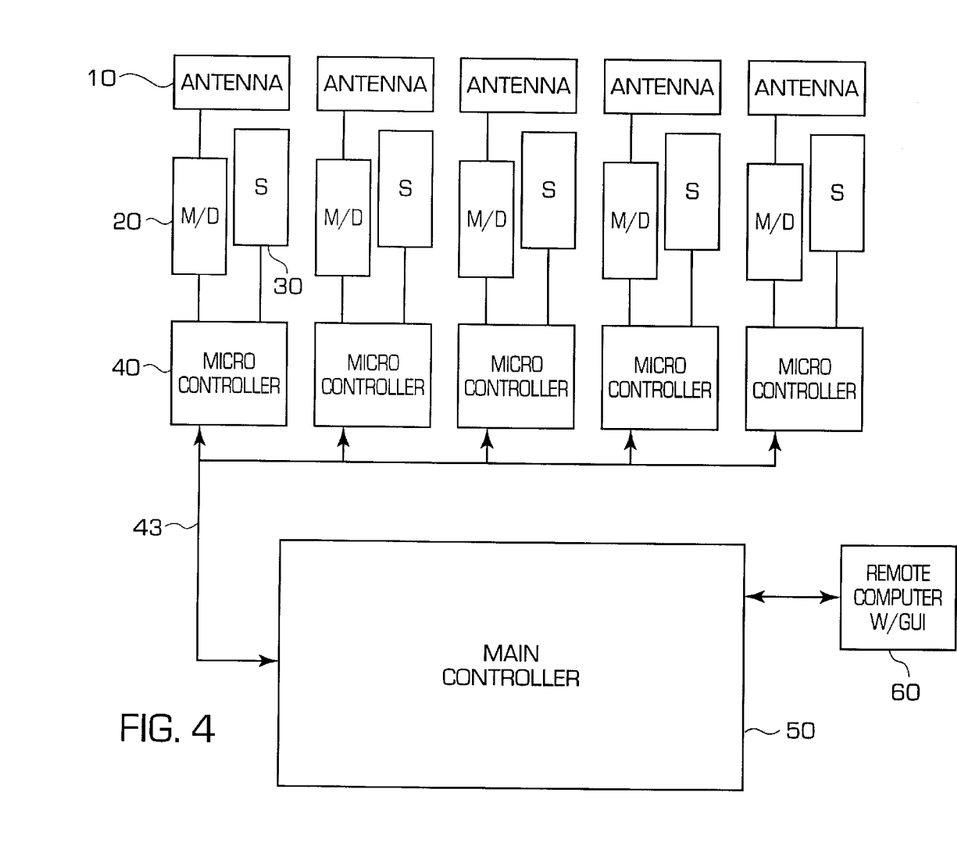
FIG. 4 shows a block diagram of an antenna control system according to an alternative embodiment of the invention.
Figure 5:
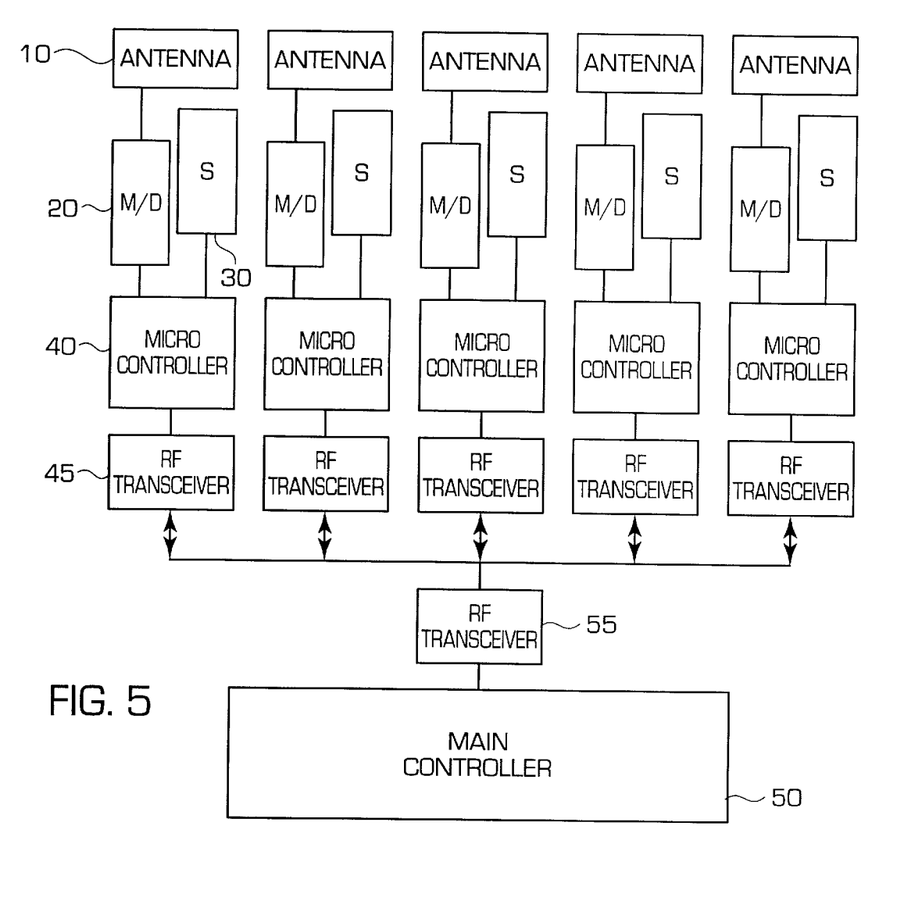
FIG. 5 shows a block of an antenna control system according to an alternative embodiment of the invention.

According to an alternative embodiment, shown in FIG. 4, a parallel communications bus 43 may be used to connect the main controller with the antenna controllers 40 employing individual connections with each controller. However, such a configuration would entail a higher cost in equipment in addition to the increased overhead associated with inter-controller communication. Alternatively, as shown in FIG. 5, the main controller 50 could communicate with the antenna controllers 40 using Radio Frequency (RF) messages broadcast from an associated transceiver 55. The RF messages would be received by a transceiver 45 associated with each antenna controller 40. Accordingly, each antenna controller 40 could reply by transmitting RF message using its associated transceiver 45 to the transceiver 55 associated with main controller 50, as is known in the art.

Communication between the main controller 50 and antenna controllers 40 may be implemented using a simple packet protocol, according to an exemplary embodiment of the invention, consisting of 8 bits, or one byte. According to this exemplary embodiment, the upper nibble of 4 bits contains commands that are addressed to the antenna controller and the lower nibble of 4 bits would contain the controller address. Messages sent from the antenna controllers 40 would contain data in the upper nibble and the address of the antenna controller 40 in the lower nibble.

The main controller 50 also contains a interface 503 which allows communication from a computer with a graphic user interface 504 located at the tower or a remote computer 60 via a modem interface 505. According to one preferred embodiment the interface 503 is a RS232 serial transceiver type interface. In addition, surge or lightning protection (not shown) may also be provided at the main controller 50.

Antenna Position Control

Control of antenna positions will now be described. If the main controller 50 wants to establish the position of the antennas 10, the main controller 50 sends an Antenna_Check command addressed to the desired controller via communication line 41. The antenna controller 40 monitors the commands on communication line 41 by reading the packets broadcast in the serial bit stream. After reading the packet the antenna controller 40 determines if the packet address matches the controller address Ant_Address. If there is no match, the antenna controller 40 continues to monitor for further commands. If the address matches, the antenna controller 40 then reads the associated command Antenna_Check and reads the antenna tilt from its associated memory 402. The antenna controller 40 then bundles the antenna position Ant_Location with the antenna controller address Ant_Address and sends the message to the main controller 50.

In order for the main controller 50 to adjust the antenna position the main controller 50 sends a Change_Tilt command addressed to the desired antenna controller 40 via communication line 41. The antenna controller 40 monitors the commands on communication line 41 by reading the packets broadcast in the serial bit stream. After reading the packet the antenna controller 40 determines if the packet address matches the antenna controller's address. If there is no match the antenna controller 40 continues to monitor for further commands. If the address matches the antenna controller's 40 address then the controller 40 reads the associated command Change_Tilt. The micro-controller 401 then reads the antenna position from its associated memory 402. The micro-controller 401 then determines the difference between the antenna's present position and the adjusted position. It then sends a commands to the motor driver 202, to adjust the antenna down-tilt. After the motor driver 202 adjusts the antenna, the micro-controller 401 reads the antenna position from sensor 30. The micro-controller then writes the position into its associated memory 402.

If the antenna position matches the expected antenna position the antenna controller 40 sends the position Ant_Location bundled with the antenna Ant_Address address to the main controller. However, if the position does not match, the antenna controller 40 sends a message Send_Fault1 to the main controller 50 bundled with the antenna's address Ant_Address indicating the antenna controller 40 was not able to establish the desired position. In addition, if the motor driver 202 does not respond, the controller sends a message Send_Fault2 to the main controller 50 bundled with the controller address indicating the driver/motor 202 is not responding. In this way the antenna controller 40 can alert the main controller 50 if there are any problems in setting the position and the main controller 50 can determine what problem exists.

In addition the main controller 50 can poll the antenna controllers 40 by sending a Check_Address command. Each antenna controller would then respond with its address message. In this way, the main controller can determine if any communication problems exist with any particular controller or the communication line as explained in further detail below. One skilled in the art will appreciate that these command protocols and methods are exemplary only, and that different procedures, commands, and messages could be used to communicate between the main controller and the antenna controllers without departing from the invention.

User Interface

Figure 6:
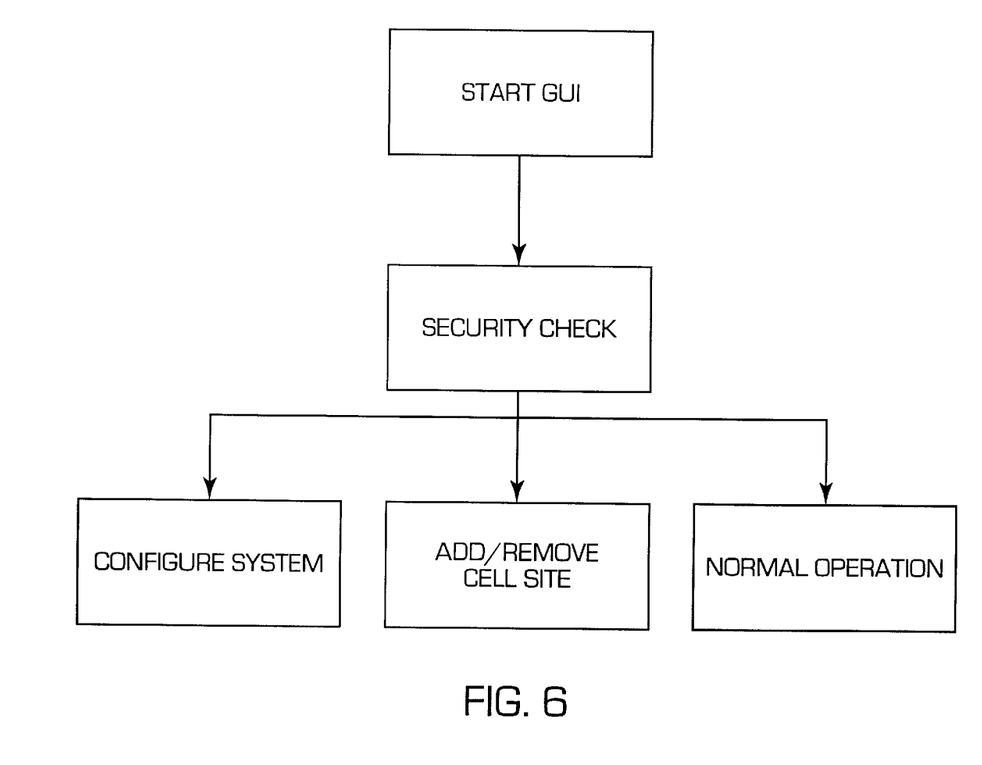
FIG. 6 is a flow chart showing graphic user interfacing with the main controller according to an exemplary of the invention.

The user interfaces 504 or 60 can be used to control the position of the antennas by a technician, or others, by operating the main controller. During initial system setup a technician, for example, would enter passwords for each base station, the addresses for the tower antennas, the telephone number of the remote and controller ID as shown in FIG. 6. After the system is set up, the user can then set the down-tilt of each antenna, which is then stored in the main controller. According to one preferred embodiment, the remote computer 60 may be a laptop computer. According to this embodiment, a user would call up the modem interface 505 associated with the desired tower or base station. The user would then be connected to the main micro-controller 501 through modem interface and serial interface 503. Upon connection, the micro-controller 501 and user computer 60 establish communications using handshaking protocols as is known in the art. After communication is established, the micro-controller 501 may execute security checks to establish the identity of the user. For example, the serial number from the micro-controller 501 could be read by the main controller and compared to a user serial number for user identification and verification.

After communications have been established, the user via the remote computer 60 can read the antenna positions from the controller memory 502 for display on the graphic user interface. In order to position the antennas, the user enters the desired antenna positions using the GUI which transmits the commands to the main micro-controller 501. The main micro-controller 501 would then adjust the position using the command protocol explained above. After adjusting or reading the antenna positions the main micro-controller 501 would acknowledge back to the user 50 if the positioning was successful. The main micro-controller 50 would respond, for example, "I set antenna_N to tilt_T," or "I could not set because of Fault_F."

The remote user could then proceed to adjust other antenna positions by entering new antenna positions. As a result, the antenna positions could be easily read and changed by a user at a location remote from the base station. For example, according to the embodiments of the invention, a technician could access the base station via a cell phone and laptop computer. This would allow the technician, for example, to drive throughout a service area taking measurements of the radiation propagating from the individual antennas of the base stations. As a result of the measurements, the technician would then be able to adjust the antenna in order to optimize the coverage provided by the base station. This is a major improvement over previous methods of adjusting base station antennas, especially when adding new base stations, or during system reconfigurations, when several adjustments are usually necessary to establish the desired optimal coverage. Additionally, multiple antenna positions can be stored in the memory at the base station for a given cell site to be recalled at a later time. This allows for easy adjustment between radiation patterns.

The remote user interface 60 also allows the antenna's positioning to be tested. For example, if the main controller 50 sends messages to the antenna controllers 40 and receives no answer, it can be determined that there possibly is problem with the communication cable 41. Additionally, each of the antenna controllers 40 can be polled. If an antenna controller 40 fails to respond, it is then determined that there is a problem with the individual antenna controller 40. Finally, if the antenna 10 becomes stuck, the antenna controller 40 can send a message to the main controller 50 indicating that the antenna controller 40 attempted to adjust the position but the gear train did not move or the motor did not start.

Once the user has interfaced with a particular cell cite, the user can then requested a system check, request a tilt setting change to a specific antenna, or request a tilt setting change to each specific antenna affected by a group changed.

System Check

Figure 7A:
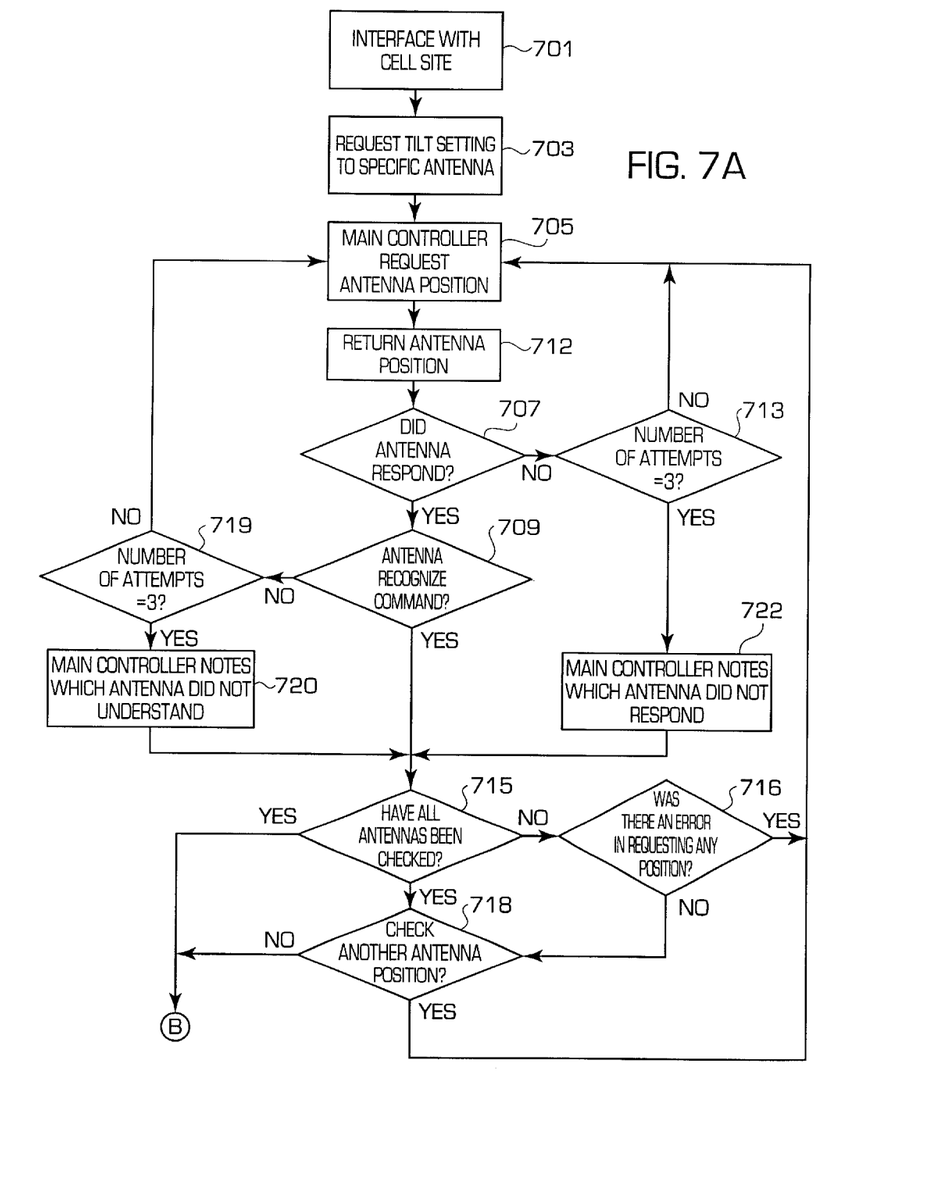
FIGS. 7A & B are flow charts showing operation and control of the antennas according to an exemplary embodiment of the invention.
Figure 7B:
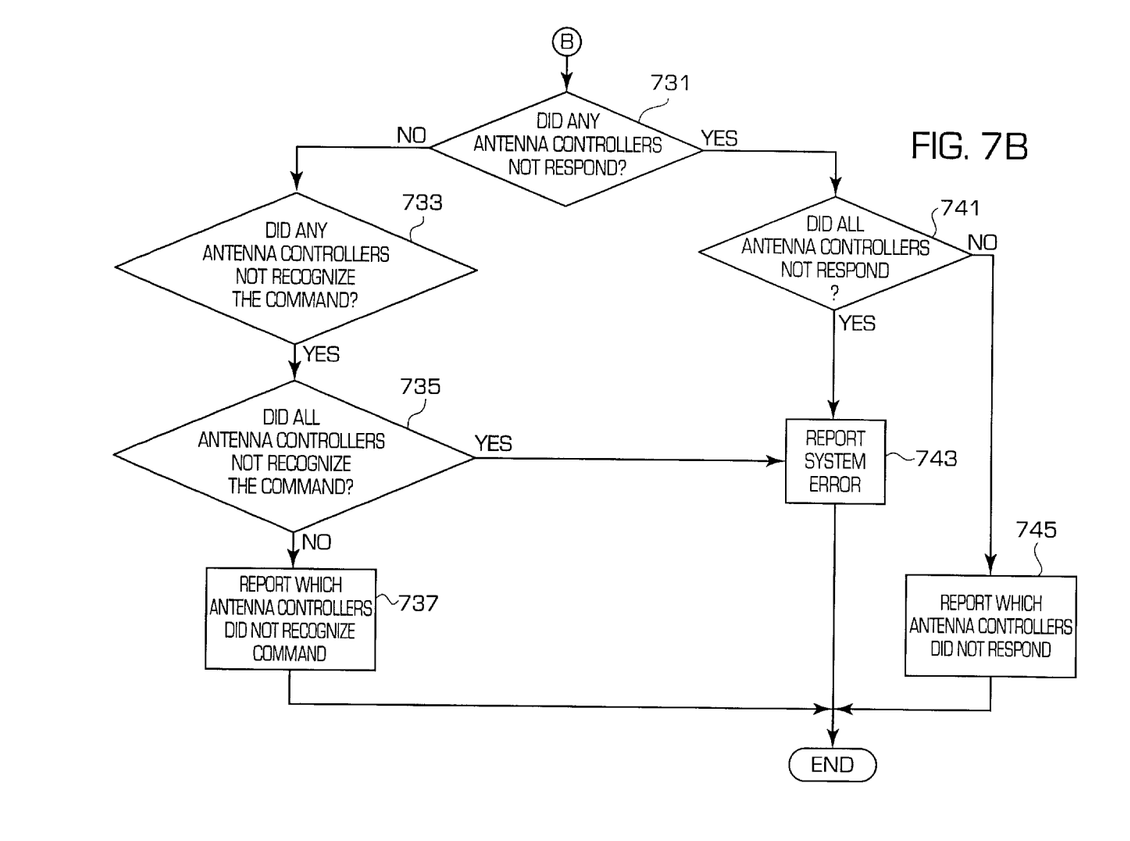

Turning to FIGS. 7A–B an exemplary method of performing a system check will now be described. Turning to the exemplary embodiment shown in FIG. 7A, a user interfaces with a particular cell cite 701, for example, through a modem connection using a Personal computer or laptop computer. Once connected to the cell site the user can perform several different functions. One possible function is to request a system check 703 in order to retrieve each antenna's current setting and compare them to previous settings. In order to perform a system check the GUI 60 under control of the user transmits a command to the main controller 50 to execute a system check.

After requesting a system check 703, the main controller 50 transmits a Antenna_Check command 705 combined with an antenna controller address Ant_Address. The main controller 50 then waits for a response from the antenna controller 40 with the requested setting 707. If the antenna controller 40 does not respond, the main controller 50 makes several more attempts to obtain the requested information by re-transmitting the command to the antenna controller 40. After 3 attempts, if the antenna controller 40 does not respond 713, the main controller notes which antenna address did not respond 722.

If the antenna controller 40 did respond, the main controller 50 then determines if the command was understood 709 by the antenna controller 40. If the command was not understood by the antenna controller 40, the main controller 50 re-transmits the command up to three times 719, for example. If the antenna controller 40 does not respond after 3 attempts the main controller 50 makes note of which antenna controller 40 did not understand the command and what the command was 720.

If the antenna controller 40 recognizes the command then the antenna controller 40 responds with the antenna's position Ant_Location and the antenna's address Ant_Address. The main controller 50 then determines if all the antennas have been polled 715. If not, the main controller 50 then determines if there was and error in attempting to read the antenna position 716, for example, the antenna did not respond or did not recognize the command. If there were no errors, the main controller 50 queries if the user would like to read any other addresses 718. In the alternative, the system check could be configured to read all antenna positions in which case it would automatically request the next antenna's position. If the main controller 50 does determine that there has been an error, the main controller 50 attempts to check the next antenna's position 705, as described above.

Once all the antennas 10 have been checked or if the user does not wish to check any further antennas 10, then the main controller 50 determines if any of the antenna controllers 40 did not respond 731. If any of the antenna controllers 40 did not respond, the main controller 50 then determines if all the antenna controllers 40 did not respond 741 (FIG.

7B). If so, the main controller 50 determines that there was a system error and that communication was not established with the antenna controllers 743. However, if only certain antenna controllers 40 did not respond, then the main controller 50 notes which ones and reports the problem controllers 745.

If all the antenna controllers 40 responded, then the main controller 50 determines if any of the antenna controllers 40 did not recognize the command to report the antenna's position 733. If this is the case, then the main controller 50 determines if all the antenna controllers 40 did not report their positions 735. If they did not, the main controller 50 reports to the GUI that there was a system error and what command was not recognized 743. If only certain antenna controllers 40 did not understand the command then the main controller 50 reports to the user which antenna controllers 40 were not able to recognize the commands 737.

Tilt Setting Change

Figure 8A:
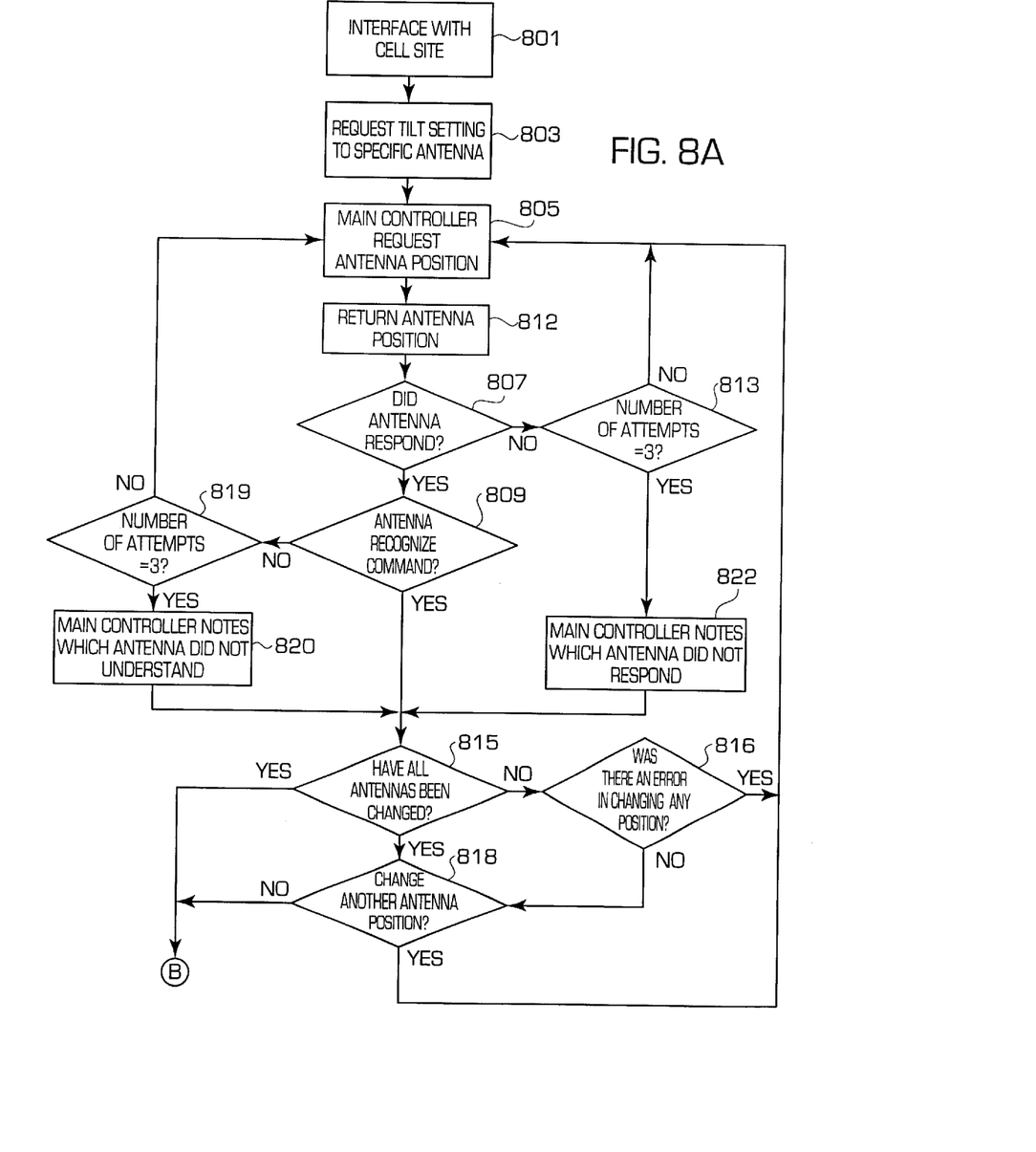
FIGS. 8A & B are flow charts showing operation and control of the antennas according to an exemplary embodiment of the invention.
Figure 8B:
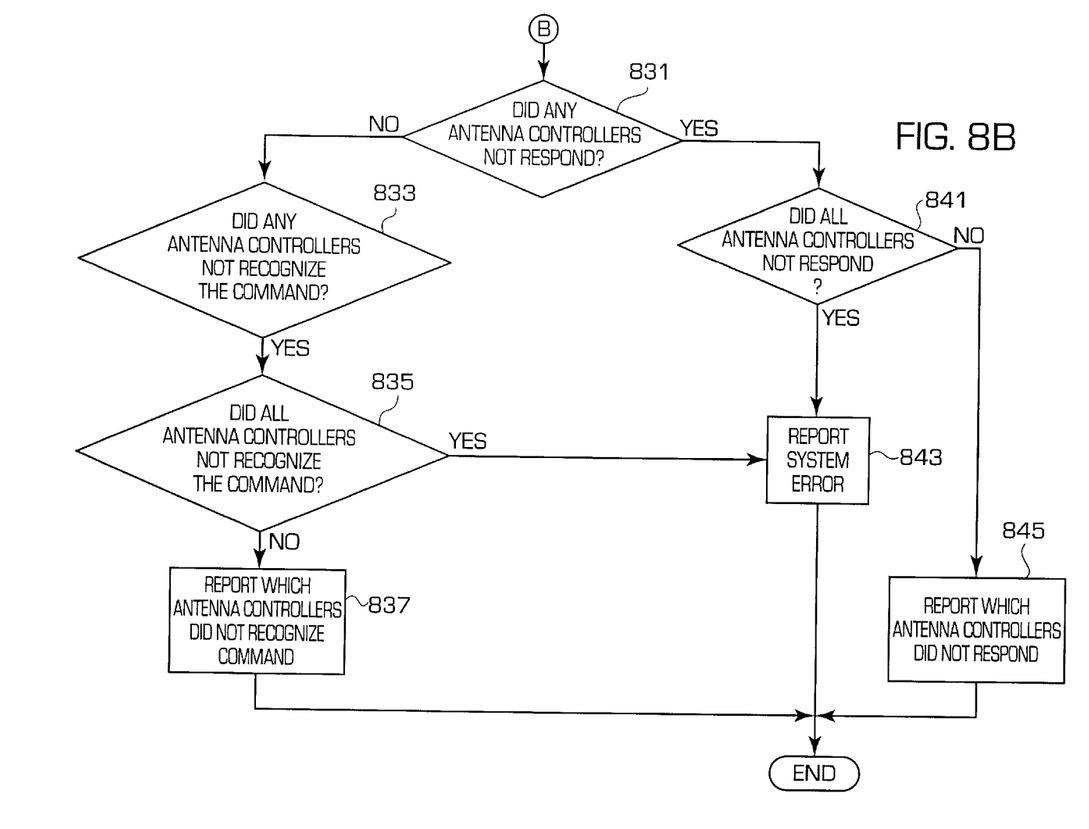

Turning to FIGS. 8A–B, an exemplary method of performing a tilt setting change will now be described. Turning to the exemplary embodiment shown in FIG. 8A, as previously described, a user interfaces with a particular cell cite 801, for example, through a modem connection using a Personal computer or laptop computer. In order to perform a tilt setting change, the GUI 60 under control of the user transmits a command to the main controller 50 to execute a tilt setting change.

After requesting a tilt setting change 803, the main controller 50 transmits a Change_Tilt command 805 combined with an antenna controller address Ant_Address. The main controller 50 then waits for a response from the antenna controller 40 setting 807.

If the antenna controller 40 recognizes the command then the antenna controller 40 responds with the antenna's new position Ant_Location and the antenna's address Ant_Address. If there was a problem and the antenna controller 40 was not able the position the antenna, the antenna controller 40 sends a fault message, as previously described, to the main controller 50.

If the antenna controller 40 does not respond, the main controller 50 makes several more attempts to obtain adjust the antenna's tilt by re-transmitting the command to the antenna controller 40. After 3 attempts, if the antenna controller 40 does not respond 813, the main controller notes which antenna address did not respond 822.

If the antenna controller 40 did respond, the main controller 50 then determines if the command was understood 809 by the antenna controller 40. If the command was not understood by the antenna controller 40, the main controller 50 re-transmits the command up to three times 819, for example. If the antenna controller 40 does not respond after 3 attempts the main controller 50 makes note of which antenna controller 40 did not understand the command and what the command was 820.

The main controller 50 then determines if all the antennas have been changed 815. If not, the main controller 50 then determines if there was and error in attempting to change the antenna position 816, for example, the antenna controller 40 did not respond or did not recognize the command. If there were no errors, the main controller 50 queries if the user would like to change any other addresses 818. If the main controller 50 does determine that there has been an error, the main controller 50 attempts to execute a command with another antenna controller 805.

Once all the antennas 10 have been changed or if the user does not wish to change the position of any further antennas 10, then the main controller 50 determines if any of the antenna controllers 40 did not respond 831. If any of the antenna controllers 40 did not respond, the main controller 50 then determines if all the antenna controllers 40 did not respond 841. If so, the main controller 50 determines that there was a system error and that communication was not established with the antenna controllers 843. However, if only certain antenna controllers 40 did not respond, then the main controller 50 notes which ones and reports the problem controllers 845.

If all the antenna controllers 40 responded, then the main controller 50 determines if any of the antenna controllers 40 did not recognize the command to change the antenna's position 833. If this is the case, then the main controller 50 determines if all the antenna controllers 40 were not able to recognize the commands 835. If they did not, the main controller 50 reports to the GUI that there was a system error and what commands were not recognized 843. If only certain antenna controllers 40 did not understand the command then the main controller 50 reports to the user which antenna controllers 40 were not able to recognize the commands 837. If there were any faults with the antenna controllers 40, the main controller 50 reports what faults occurred.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. An antenna control system comprising:
   a sensor for detecting a position of a down-tilt antenna without respect to a satellite position;
   an antenna controller communicating with said sensor for controlling said antenna position;
   a main controller communicating with said antenna controller in order to control said antenna controller; and
   a user interface communicating with said main controller to operate said main controller.

2. The antenna control system according to claim 1, wherein the user interface transmits data to said main controller to position said down-tilt antenna and receives data from said main controller indicating said antenna position.

3. The antenna control system according to claim 2, wherein said main controller informs said user interface that said main controller is unable to communicate with said antenna controller.

4. The antenna control system according to claim 2, wherein said main controller informs said user interface that it is unable to adjust said antenna position to a desired antenna position.

5. The antenna control system according to claim 1, wherein said user interface is remotely located from said main controller.

6. The antenna control system according to claim 1, wherein said user interface communicates with the main controller over a wireless interface.

7. The antenna control system according to claim 1, wherein said user interface communicates with the main controller over a telephone line.

8. An antenna control system comprising:
a sensor for detecting a position of a down-tilt antenna without respect to a satellite position;
an antenna controller communicating with said sensor for controlling said antenna position;
a main controller communicating with said antenna controller in order to control said antenna controller, wherein said main controller is remotely located from said down-tilt antenna, and
an antenna controller memory connected to said antenna controller for storing at least one of an antenna address and said antenna position.

9. The antenna control system according to claim 8, further comprising a main controller memory connected to said main controller for storing at least one of an antenna address and said antenna position.

10. The antenna control system according to claim 8, further comprising:
a motor for adjusting said antenna position; and
a driver connected to said motor and said antenna controller for activating said motor.

11. A method of positioning a down-tilt antenna in an antenna control system used in land-based mobile communications, said method comprising the steps of:
(A) establishing a current position of the down-tilt antenna by;
    (i) sending an antenna check command to an antenna controller,
    (ii) reading a tilt position stored in a memory of the antenna controller, and
    (iii) sending the tilt position read from the memory to a main controller; and
(B) adjusting the tilt of the down-tilt antenna by;
    (i) sending a change-tilt command to the main controller,
    (ii) calculating a difference between the tilt position and the change-tilt command to determine an antenna adjust command, and
    (iii) sending the antenna adjust command to an antenna motor driver assembly to adjust the tilt of the down-tilt antenna.

12. The method according to claim 11, wherein step (B) further comprises, (iv) reading the newly adjusted tilt position of the down-tilt antenna via a sensor, and (v) writing the newly adjusted tilt position as the tilt position in the memory of the antenna controller.

13. A method of performing a system check on a tilt antenna control system, said method comprising the steps of:
(A) requesting a system check by a user via a user interface;
(B) transmitting an antenna check command from a main controller to an addressed one of a plurality of antenna controllers;
(C) returning an antenna position from the addressed antenna controller to the main controller; and
(D) determining whether the addressed antenna controller responded.

14. The method of performing a system check according to claim 13, further comprising the steps of:
(E) if the addressed antenna controller did not respond, then
    (i) repeating steps (A)–(D) for the addressed antenna controller a specified number of times, and
    (ii) recording that the addressed antenna controller did not respond if the specified number of times is met; and (F) if the addressed antenna controller did respond, then
    (i) determining whether the addressed antenna controller understood the antenna check command;
        (1) if the addressed antenna controller did not understand the antenna check command, then repeat steps (B)–(F) a predetermined number of times, and recording that the addressed antenna controller did not understand if the predetermined number of times is met, else
        (2) if the addressed antenna controller does understand the antenna check command, go to step (G); and
(G) determining whether all of the antenna controllers have been polled.

15. The method according to claim 14, further comprising the step of:
(H) repeating steps (B)–(G) for all of the plurality of antennas controllers.

16. The method according to claim 15, further comprising the step of:
(I) determining whether any of the plurality of antennas controllers did not respond or recognize the antenna check command, and
    (i) if all of the antenna controllers either did not respond, or did not recognize the antenna check command, then report a system error to the user; else
    (ii) if any of the antennas controllers either did not respond, or did not recognize the antenna check command, then report to the user which antenna controllers did not respond or did not recognize the antenna check command.

17. The method according to claim 14, further comprising the steps of:
(H) prompting the user whether to check any other antenna controller addresses, and
(I) repeating steps (B)–(G) for each antenna controller address on which the user desires to perform a system check.

18. A method of performing a tilt setting change on an antenna system, said method comprising the steps of:
(A) transmitting a tilt setting change command, selected by a user, from a user interface to a main controller; and
(B) transmitting a change tilt command combined with an antenna controller address from the main controller to an addressed antenna controller of a plurality of antenna controllers.

19. The method of performing a tilt setting change according to claim 18, further comprising the steps of:
(C) if the addressed antenna controller recognizes the change tilt command, then
    (i) if the addressed antenna controller was able to position an associated down-tilt antenna, sending a new position antenna location signal to the main controller, to indicate the new position of the associated down-tilt antenna; else
    (ii) if the addressed antenna controller was unable to position the associated down-tilt antenna, sending a fault message to the main controller; or
(D) if the addressed antenna controller does not recognize the change tilt command or respond, repeating steps (B)–(D) a predetermined number of times and recording which antenna address did not recognize the change tilt command or respond, if the predetermined number of times is met.

20. The method according to claim 19, further comprising the step of:
(E) repeating steps (A)–(D) for a plurality of antenna tilt setting changes selected by the user.

21. The method according to claim 20, further comprising the step of:
- (F) determining whether any of the plurality of antenna controllers did not respond or recognize the change tilt command, and
  - (i) if all of the addressed antenna controllers either did not respond, or did not recognize the change tilt command, then report a system error to the user; else
  - (ii) if any of the antennas controllers either did not respond, or did not recognize the change tilt command, then report to the user which antenna controllers did not respond or did not recognize the change tilt command.

22. The antenna control system according to claim 1, wherein the position of the down-tilt antenna is an electrical down-tilt.

23. The antenna control system according to claim 1, wherein the position of the down-tilt antenna is a position of at least one phase shifter.

24. The method according to claim 11, wherein the tilt position is an electrical down-tilt.

25. The method according to claim 11, wherein the tilt position is a position of at least one phase shifter.

26. An antenna control system comprising:
- a sensor for detecting a position of components used to down tilt an antenna and by this action determine the down tilt of the antenna;
- an antenna controller communicating with said sensor for controlling said antenna position;
- a main controller communicating with said antenna controller in order to control said antenna controller, wherein said main controller is remotely located from said antenna,
- a user interface communicating with said main controller to operate said main controller, and
- an antenna controller memory connected to said antenna controller for storing at least one of an antenna address and said antenna position.

27. The antenna control system according to claim 26, wherein said user interface is remotely located from said main controller.

28. The antenna control system according to claim 26, wherein the user interface transmits data to said main controller to position said antenna and receives data from said main controller indicating said position.

29. The antenna control system according to claim 26, wherein said user interface communicates with the main controller over a wireless interface.

30. The antenna control system according to claim 27, wherein said user interface communicates with the main controller over a telephone line.

31. The antenna control system according to claim 27, wherein the position of the antenna is an electrical down-tilt.

32. The antenna control system according to claim 27, wherein the position of the antenna is a position of at least one phase shifter.

* * * * *